United States Patent [19]

Yamada et al.

[11] 4,083,729
[45] Apr. 11, 1978

[54] HYDRAULIC CEMENT COMPOSITION

[75] Inventors: Senri Yamada, Takatsuki; Kanji Nagasawa, Nagaokakyo; Tokiaki Mori, Ibaraki; Masaru Tanaka, Toyonaka, all of Japan

[73] Assignees: Fujisawa Pharmaceutical Co., Ltd.; Dai-Ichi Kogyo Seiyaku Co., Ltd., both of Japan

[21] Appl. No.: 764,880

[22] Filed: Feb. 2, 1977

[51] Int. Cl.² ............................................. C04B 7/35
[52] U.S. Cl. ....................................... 106/88; 106/90; 106/314
[58] Field of Search .................. 106/86, 88, 90, 314

[56] References Cited

U.S. PATENT DOCUMENTS

| 2,776,902 | 1/1957 | Scripture | 106/90 |
| 2,848,340 | 8/1958 | Haldas | 106/90 |
| 3,033,889 | 5/1962 | Chiddix et al. | 106/86 |
| 3,351,478 | 11/1967 | Dodson et al. | 106/90 |

Primary Examiner—J Poer

Attorney, Agent, or Firm—Oblon, Fisher, Spivak, McClelland & Maier

[57] ABSTRACT

An improved hydraulic cement composition having an almost constant air content, which is incorporated with an organic phosphoric acid ester of the formula

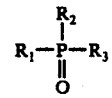

Wherein $R_1$ is a group of the formula: $R_4-O-(CH_2CH_2O)_n-$ wherein $R_4$ is an alkyl having 4 to 18 carbon atoms, an alkenyl having 4 to 18 carbon atoms or an aryl substituted with an alkyl having 4 to 18 carbon atoms and n means an average addition molar number of ethylene oxide and is an integer of 0 to 15 in average, and $R_2$ and $R_3$ are the same or different and are each hydroxy or a group of the formula: $R_4-O-(CH_2CH_2O)_n-$ wherein $R_4$ and n are as defined above, or a salt thereof with an inorganic or organic base, as an air entraining agent, optionally together with a dispersing agent and an accelerator.

10 Claims, No Drawings

HYDRAULIC CEMENT COMPOSITION

The present invention relates to an improved hydraulic cement composition incorporated with air entraining agent.

It is well known that a hydraulic cement composition, such as a concrete, mortar or the like, is incorporated with an air entraining agent in order to improve the workability or fluidity of the composition or the resistance to freezing and thawing thereof of entraining air into the concrete, mortar or the like. For this purpose, it is desirable to keep the air content with the air entraining agent at a fixed level (for example, 4 + 1% by volume in the standard of The Society of Buildings in Japan). According to the conventional air entraining agents, however, the air content entrained thereby is variable with various factors, such as the water cement ratio (i.e. the ratio of water to cement) in the hydraulic cement composition, the degree of replacement with fly ash, the consistency of concrete and mortar, or the like, and there has never been known a satisfactory air entraining agent.

As the results of extensive study by the present inventors, it has been found that specific organic phosphoric acid esters have excellent properties as the air entraining agent and further that when the organic phosphoric acid esters are incorporated into the hydraulic cement composition, the air content can be kept at a fixed level without being affected with the various factors mentioned above.

An object of the present invention is to provide an improved hydraulic cement composition incorporated with an organic phosphoric acid ester as an air entraining agent.

Another object of the invention is to provide a hydraulic cement composition having a constant air content.

A further object of the invention is to provide the use of organic phosphoric acid esters as an air entraining agent for a hydraulic cement composition.

Other objects and further scope of applicability of the present invention will become apparent from the detailed description given hereinafter; it should be understood, however, that the detailed description and specific examples, while indicating preferred embodiments of the invention, are given by way of illustration only, since various changes and modification within the spirit and scope of the invention will become apparent to those skilled in the art from this detailed description.

The organic phosphoric acid esters used in the present invention are a compound of the formula:

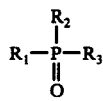

wherein $R_1$ is a group of the formula: $R_4-O-(CH_2CH_2O)_n-$ wherein $R_4$ is an alkyl having 4 to 18 carbon atoms, preferably 8 to 18 carbon atoms, an alkenyl having 4 to 18 carbon atoms, preferably 8 to 18 carbon atoms, or an aryl substituted with an alkyl having 4 to 18 carbon atoms, preferably 8 to 18 carbon atoms, $n$ means an average addition molar number of ethylene oxide and is usually an integer of 0 to 15, preferably 5 to 14, in average; $R_2$ and $R_3$ are the same or different and are each hydroxy or a group of the formula: $R_4-O-(CH_2CH_2O)_n-$ wherein $R_4$ and $n$ are as defined above.

Some of the organic phosphoric acid esters are known and can be readily prepared by reacting one mole of $P_2O_5$ with 2 to 4.5 moles of a nonionic surface active agent having the molecular configuration of a condensation product of at least one mole of ethylene oxide with one mole of a compound containing at least 4 carbon atoms and a reactive hydrogen atom under substantially anhydrous conditions and at a temperature below about 110° C (U.S. Pat. No. 3,004,057). Some other organic phosphoric acid esters can be prepared in the same manner as described above or by other conventional methods.

In the present specification, "alkyl having 4 to 18 carbon atoms" includes butyl, isobutyl, pentyl, hexyl, heptyl, octyl, nonyl, decyl, undecyl, dodecyl, tridecyl, tetradecyl, pentadecyl, hexadecyl, heptadecyl, and octadecyl; "alkenyl having 4 to 18 carbon atoms" includes butenyl, isobutenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, and octadecenyl; and "aryl substituted with an alkyl having 4 to 18 carbon atoms" includes phenyl, naphthyl, tolyl, and xylyl, which are substituted with any one of the alkyls mentioned above.

The organic phosphoric acid esters include also salts thereof, which include an inorganic or organic salt, such as a salt of sodium, potassium, magnesium, ammonium, monoethanolamine, triethanolamine, or hexylamine.

The hydraulic cement composition to be incorporated with the organic phosphoric acid ester includes all of the conventional hydraulic cement compositions, for instance, compositions of a cement (e.g. blast furnace cement, portland cement, alumina cement), water and various additives such as fine aggregates, coarse aggregates, fly ash or the like. Suitable examples of the composition are concrete, mortar, or the like. The organic phosphoric acid esters may be used as a single compound or in a mixture of two or more kinds thereof. For instance, there may be used a mixture of a monoester (i.e. a compound of the formula (I) wherein any one of $R_1$, $R_2$ and $R_3$ are a group of the formula: $R_4-O-(CH_2CH_2O)_n-$ and the remaining two groups are each hydroxy) and a diester (i.e. a compound of the formula (I) wherein any two of $R_1$, $R_2$ and $R_3$ are a group of the formula: $R_4-O-(CH_2CH_2O)_n-$ and the remaining one group is hydroxy) and/or a triester (i.e. a compound of the formula (I) wherein $R_1$, $R_2$ and $R_3$ are each a group of the formula: $R_4-O-(CH_2CH_2O)_n-$). The mixed ratio of the monoester and the diester and/or triester is not specified.

The organic phosphoric acid esters may be incorporated into the hydraulic cement composition as they are, or after diluted with a solvent (e.g. water), or together with other additives, such as various dispersing agents for cement (e.g. gluconic acid, sodium gluconate, or glucono-δ-lactone), or various accelerators (e.g. triethanolamine). Besides, they may previously be admixed into the materials for the hydraulic cement composition or may be admixed when the composition such as concrete or mortar is prepared. The organic phosphoric acid esters are usually used in an amount of 0.0001 to 2% by weight on the basis of the weight of cement in the composition. The dispersing agent and the accelerator are usually used each in a conventional amount thereof, which is variable with the kind of the same. For instance, in case of sodium gluconate, it is used in an amount of 0.01 to 1% by weight on the basis of the weight of cement.

In the present hydraulic cement composition containing the organic phosphoric acid ester, a prescribed amount of air can be entrained when the composition such as concrete or mortar is prepared, and further, the amount of entrained air is hardly affected with the various factors, such as the water cement ratio in the hydraulic cement composition, the degree of replacement with fly ash, the consistency of concrete and mortar, or the like, and can be kept at a fixed amount. Thus, the hydraulic cement composition of the present invention has excellent performances.

The effects of the organic phosphoric acid esters in the present composition are illustrated by the following test results.

The organic phosphoric acid esters used in the following tests 1 to 5, or Examples are as shown in the following table.

| Compound No. | Chemical structure |
|---|---|
| 1 | $C_9H_{19}$—⟨⟩—O—$(CH_2CH_2O)_9$—P(=O)(OH)(OH) |
| 2 | $[C_9H_{19}$—⟨⟩—O—$(CH_2CH_2O)_9]_2$P(=O)—OH |
| 3 | $C_{12}H_{25}O$—$(CH_2CH_2O)_5$—P(=O)(OH)(OH) |
| 4 | $[C_{12}H_{25}O$—$(CH_2CH_2O)_5]_2$P(=O)—OH |
| 5 | $C_9H_{19}$—⟨⟩—O—$(CH_2CH_2O)_{10}$—P(=O)(OH)(OH) |
| 6 | $[C_9H_{19}$—⟨⟩—O—$(CH_2CH_2O)_{10}]_2$P(=O)—OH |
| 7 | $C_{18}H_{35}O$—$(CH_2CH_2O)_{12}$—P(=O)(OH)(OH) |
| 8 | $[C_{18}H_{35}O$—$(CH_2CH_2O)_{12}]_2$P(=O)—OH |

The above compounds are prepared as follows:

PREPARATION 1

To a 3 liter four-necked flask is added nonylphenol ethylene oxide adduct [addition molar number: 9 in average, 1850 g (3 mol)] and thereto is gradually added phosphoric acid anhydride [142 g (1 mol)] with agitation under cooling. The mixture is reacted with agitation at 45°–75° C for about 4 hours (the acid value of the reaction product: 85). The reaction mixture is neutralized to pH about 8 with an aqueous sodium hydroxide solution to give an equimolar mixture of the sodium salts of the monoester (Compound No. 1, content: 48.6 mmol/100 g) and the diester (Compound No. 2, content: 48.6 mmol/100 g).

PREPARTION 2

To a 2 liter four-necked flask is added lauryl alcohol ethylene oxide adduct [addition molar number: 5 in average, 1218 g (3 mol)] and thereto is gradually added phosphoric acid anhydride [142 g (1 mol)] with agitation under cooling. The mixture is reacted with agitation at 45°–75° C for about 4 hours to give an equimolar mixture of the monoester (Compound No. 3, content: 73.53 mmol/100 g) and the diester (Compound No. 4, content: 73.53 mmol/100 g) (the acid value of the reaction product: 159).

PREPARATION 3

To a 3 liter four-necked flask is added nonylphenol ethylene oxide adduct [addition molar number: 10 in average, 1585 g (2.4 mol)] and water [10.8 g (0.6 mol)] and thereto is gradually added phosphoric acid anhydride [142 g (1 mol)] with agitation under cooling. The mixture is reacted with agitation at 45°–70° C for about 6 hours (the acid value of the reaction product: 116). The reaction mixture is neutralized to pH about 8 with monoethanol-amine to give a mixture of the monoethanolamine salts of the monoester (Compound No. 5, content: 81.9 mmol/100 g) and the diester (Compound No. 6, content: 20.5 mmol/100 g) (molar ratio thereof: 4 : 1).

PREPARATION 4

To a 3 liter four-necked flask is added oleyl alcohol ethylene oxide adduct [addition molar number: 12 in average, 2390 g (3 mol)] and thereto is gradually added phosphoric acid anhydride [142 g (1 mol)] with agitation under cooling. The mixture is reacted with agitation at 45°–75° C for about 6 hours to give an equimolar mixture of the monoester (Compound No. 7, content: 39.5 mmol/100) and the diester (Compound No. 8, content: 39.5 mmol/100 g) (the acid value of the reaction product: 67).

TEST 1

The air entraining in the compositions having various water cement ratios

Materials

Cement: Asano Portland Cement (made by Nihon Cement Co., Ltd., specific gravity: 3.16)

Fine aggregate: River sands (specific gravity: 2.58, finness modulus: 2.84)

Coarse aggregate: River gravels (specific gravity: 2.60, maximum size: 25 mm)

The above-mentioned materials for the hydraulic cement composition were admixed with an aqueous solution of an equimolar mixture of the compound Nos. 1 and 2 or of a mixture of said equimolar mixture of the compound Nos. 1 and 2 and sodium gluconate in the proportion as mentioned in the following Table 1. The mixture was mixed for 3 minutes with a gravity mixer to give a concrete composition.

The air content, the slump and the compressive strength of the concrete composition were measured by the following methods.

1. Measurement of the slump of the fresh concrete:

The slump is measured by the method as disclosed in JIS A 1101 as follows:

A steel slump cone (inside diameter of the upper end: 10 cm, inside diameter of the lower end: 20 cm, height: 30 cm) is put on an iron plate provided horizontally. A test sample of a mixed fresh concrete is divided into three groups in almost equal amount and is filled into the slump cone in three layers. Each layer is uniformly pounded 25 times with a steel pole having a semi-spherical end (diameter: 15 mm, length: 50 cm). The upper surface of the concrete filled into the slump cone is leveled at the level of the upper end of the slump cone. Thereafter, the slump cone is gently set up vertically, and then the slump of the concrete at the central part thereof is measured.

2. Measurement of air content of the fresh concrete:

The air content is measured by the method as disclosed in JIS A 1128 as follows:

A test sample of a mixed fresh concrete is divided into three groups in almost equal amount and is filled into a Washington-type air meter (7 liter) in three layers. Each layer is uniformly pounded 25 times with a steel pole having a semi-spherical end (diameter: 15 mm, length: 50 cm). The outside of the vessel is nocked with a wooden hammer 10–15 times in order to tighten the concrete. The upper surface of the fresh concrete filled into the vessel is leveled at the level of the upper end of the vessel, and then the vessel is tightly closed with a half-round cap including a cylindrical air chamber at the central area thereof, at the upper end of which a pressure gauge is provided. Thereafter, the space within the vessel is filled with water which is poured through a pouring inlet. The indicator of the pressure gauge is made coincident with the initial pressure point. After 5 seconds, the valve is opened, and then the side wall of the vessel is knocked with a wooden hammer. When the deflection of the indicator of the pressure gauge is stopped, the scale of the indicator is read. The air content is calculated by the following equation:

$$A (\%) = A_1 - G$$

wherein A is an air content (%) in the fresh concrete, $A_1$ is the scale reading of the pressure gauge, and G is an air content of the aggregates.

3. Measurement of the compressive strength of concrete:

The compressive strength of concrete is measured by the method as described in JIS A 1108 and JIS A 1132 as follows:

A test sample of a mixed fresh concrete is divided into two groups in almost equal amount and is filled into a mold (inside diameter: 10 cm, height: 20 cm) in two layers. Each layer is pounded with a steel pole having a semi-spherical end (diameter: 15 mm, length: 50 cm) one time per about 7 cm². The outside of the mold is knocked with a wooded hammer in order to tighten the concrete. The upper surface of the concrete filled is leveled at a slightly lower level of the upper end of the mold. After 20 hours, the upper surface of the concrete is washed with water to remove the laitance thereon and then capped with a cement paste. After additional 20 hours, the mold is taken off, and the concrete is cured in water of 21 ± 3° C. When it is cured for 7 days and 28 days, a load of 2–3 kg/cm²/second is added thereto by using a compressive strength test machine, and then the maximum load to break the concrete sample is measured. The compressive strength is calculated by dividing the maximum load by the sectional area of the concrete sample.

The results are shown in the following Table 1.

Table 1

| Test compounds | Proportion of the test compounds to cement (% by weight) | Weight of water (kg/m³) | Weight of cement (kg/m³) | Water cement ratio (% by weight) | Weight of fine aggregate (kg/m³) | Weight coarse aggregate (kg/m³) | Ratio of the fine aggregate in whole aggregates (% by weight) |
|---|---|---|---|---|---|---|---|
| Equimolar mixture of compound Nos. 1 and 2 | 0.005 | 178 | 254 | 70 | 760 | 1058 | 42 |
| | | 173 | 315 | 55 | 674 | 1108 | 38 |
| | | 176 | 440 | 40 | 582 | 1090 | 35 |
| Equimolar mixture of compound Nos. 1 and 2 | 0.005 | 169 | 241 | 70 | 775 | 1078 | 42 |
| | | 164 | 298 | 55 | 688 | 1131 | 38 |
| | | 167 | 418 | 40 | 596 | 1117 | 35 |
| + Sodium gluconate | 0.2 | | | | | | |

| Test compounds | Slump (cm) | Air content (% by volume) | Compressive strength (kg/cm²) 7 days | Compressive strength (kg/cm²) 28 days |
|---|---|---|---|---|
| Equimolar mixture of compound Nos. 1 and 2 | 18.9 | 5.2 | 117 | 184 |
| | 18.3 | 5.1 | 183 | 259 |
| | 18.6 | 4.8 | 290 | 400 |
| Equimolar mixture of compound Nos. 1 and 2 + Sodium gluconate | 18.5 | 5.1 | 121 | 202 |
| | 18.6 | 5.1 | 185 | 263 |
| | 18.4 | 4.9 | 302 | 412 |

As is made clear from the above Table 1, when the organic phosphoric acid ester or the combination of the organic phosphoric acid ester and the dispersing agent of the present invention is used, the air content is almost constant.

TEST 2

Stability of the air entrained in the compositions admixed with fly ash

Materials

Cement: Asano Portlant Cement (made by Nihon Cement Co., Ltd., specific gravity: 3.16)

Fly ash: Kanden Fly Ash (made by Kansai Electric Power Co., Ltd., specific gravity: 2.00)

Fine aggregate: River sands (specific gravity: 2.58, finness modules: 2.84)

Coarse aggregate: River gravels (specific gravity: 2.60, maximum size: 25 mm)

The above-mentioned materials for the hydraulic cement composition were admixed with an aqueous solution of an equimolar mixture of sodium salts of the compound Nos. 1 and 2 or of a mixture of said equimolar mixture of sodium salts of the compound Nos. 1 and 2 and sodium gluconate in the proportion as mentioned in the following Table 2. The mixture was mixed for 3 minutes with a gravity mixer to give a concrete composition.

The air content, the slump and the compressive strength of the concrete composition were measured in the same manner as described in Test 1. The results are shown in the following Table 2.

TEST 3

The air entraining in the compositions wherein the slump is varied.

Materials

Cement: Asano Portland Cement (made by Nihon Cement Co., Ltd., specific gravity: 3.16)

Fine aggregate: River sands (specific gravity: 2.58, finness modulus: 2.84)

Coarse aggregate: River gravels (specific gravity: 2.60, maximum size: 25 mm)

The above-mentioned materials for the hydraulic cement composition were admixed with an aqueous solution of an equimolar mixture of the compound Nos. 3 and 4 or of a mixture of said equimolar mixture of compound Nos. 3 and 4 and sodium gluconate in the proportion as mentioned in the following Table 3. The mixture was mixed for 3 minutes with a gravity mixer to give a concrete composition.

In the same manner as described in Test 1, there were measured the air content, the slump and the compressive strength of the concrete composition. The results are shown in the following Table 3.

Table 2

| Test compounds | Proportion of the test compounds to cement (% by weight) | Replacement percentage with fly ash (% by weight) | Weight of fly ash (kg/m³) | Weight of cement (kg/m³) | weight of water (kg/m³) | Water cement ratio (% by weight) | Weight of fine aggregate (kg/m³) | Weight of coarse aggregate (kg/m³) |
|---|---|---|---|---|---|---|---|---|
| Equimolar mixture of sodium salts of compound Nos. 1 and 2 | 0.005 | 0 | 0 | 293 | 176 | 60 | 713 | 1078 |
| | | 10 | 29 | 256 | 171 | 60 | 716 | 1082 |
| | | 20 | 56 | 22 | 167 | 60 | 717 | 1084 |
| | | 30 | 82 | 191 | 164 | 60 | 717 | 1084 |
| Equimolar mixture of sodium salts of compound Nos. 1 and 2 + Sodium gluconate | 0.005 0.04 | 0 | 0 | 278 | 167 | 60 | 728 | 1100 |
| | | 10 | 27 | 245 | 163 | 60 | 729 | 1101 |
| | | 20 | 53 | 212 | 159 | 60 | 730 | 1103 |
| | | 30 | 78 | 182 | 156 | 60 | 730 | 1103 |

| Test compounds | Ratio of the fine aggregate in whole aggregates (% by weight) | Slump (cm) | Air content (% by volume) | Compressive stength (kg/cm²) 7 days | Compressive stength (kg/cm²) 28 days |
|---|---|---|---|---|---|
| Equimolar mixture of sodium salts of compound Nos. 1 and 2 | 40 | 18.2 | 5.1 | 165 | 259 |
| | 40 | 18.0 | 4.9 | 150 | 245 |
| | 40 | 18.1 | 4.5 | 135 | 220 |
| | 40 | 18.8 | 4.3 | 121 | 203 |
| Equimolar mixture of sodium salts of compound Nos. 1 and 2 + Sodium gluconate | 40 | 17.5 | 5.3 | 172 | 268 |
| | 40 | 18.2 | 5.0 | 159 | 250 |
| | 40 | 18.9 | 4.9 | 142 | 231 |
| | 40 | 18.5 | 4.6 | 128 | 215 |

As is made clear from the above Table 2, when the organic phosphoric acid ester or the combination of the organic phosphoric acid ester and the dispersing agent of the present invention is used, the variation of the air content is very few within the degree of replacement of fly ash of 0 to 30% by weight.

Table 3

| Test compounds | Proportion of the test compounds to cement (% by weight) | Required slump (cm) | Found slump (cm) | Weight of water (kg/m³) | Weight of cement (kg/m³) | Water cement ratio (% by weight) | Weight of fine aggregate (kg/m³) | Weight of coarse aggregate (kg/m³) |
|---|---|---|---|---|---|---|---|---|
| Equimolar mixture of compound Nos. 3 and 4 | 0.005 | 8 | 8.6 | 151 | 275 | 55 | 689 | 1183 |
| | | 5 | 14.8 | 163 | 296 | 55 | 635 | 1188 |
| | | 21 | 20.6 | 184 | 335 | 55 | 708 | 1028 |
| Equimolar mixture of compound Nos. 3 and 4 + Sodium gluconate | 0.005 0.2 | 8 | 8.0 | 144 | 62 | 55 | 700 | 1201 |
| | | 15 | 15.4 | 155 | 282 | 55 | 646 | 1210 |
| | | 21 | 21.0 | 175 | 318 | 55 | 724 | 1050 |

Table 3-continued

| Test compounds | Ratio of the fine aggregate in whole aggregates (% by weight) | Air content (% by volume) | Compressive strength (kg/cm²) | |
|---|---|---|---|---|
| | | | 7 days | 28 days |
| Equimolar mixture of compound Nos. 3 and 4 | 37 | 5.0 | 205 | 276 |
| | 35 | 5.1 | 207 | 271 |
| | 41 | 4.9 | 197 | 269 |
| Equimolar mixture of compound Nos. 3 and 4 + Sodium gluconate | 37 | 4.9 | 212 | 280 |
| | 35 | 4.9 | 214 | 275 |
| | 41 | 4.7 | 207 | 279 |

As is made clear from the above Table 3, when the organic phosphoric acid ester or the combination of the organic phosphoric acid ester and the dispersing agent of the present invention is used, the air content is almost constant, even if the slump of the composition is largely varied.

TEST 4

The air entraining in the compositions wherein the slump is varied.

Materials

Cement: Asano Portland Cement (made by Nihon Cement Co., Ltd., specific gravity: 3.17)
Fine aggregate: River sands (specific gravity: 2.60, finness modulus: 2.84)
Coarse aggregate: River gravels (specific gravity: 2.65 maximum size: 25 mm)

The above-mentioned materials for the hydraulic cement composition were admixed with an aqueous solution of an equimolar mixture of monoethanolamine salts of the compound Nos. 1 and 2 in the proportion as mentioned in the following Table 4. The mixture was mixed for 3 minutes with a gravity mixer to give a concrete composition.

In the same manner as described in Test 1, there were measured the air content, the slump and the compressive strength of the concrete composition. The results are shown in the following Table 4.

As is made clear from the above Table 4, when the organic phosphoric acid ester of the present invention is used, the air content is almost constant even if the slump is largely varied.

TEST 5

The air entraining in the compositions wherein the aggregate is varied.

Materials

Cement: Asano Portland Cement (made by Nihon Cement Co., Ltd., specific gravity: 3.17)
Fine aggregate: River sands (specific gravity: 2.60, finness modulus: 2.94) or manufactured sands (specific gravity: 2.58, finness modulus: 2.76)
Coarse aggregate: River gravels (specific gravity: 2.65, maximum size: 25 mm) or crushed stones (specific gravity: 2.65, maximum size: 20 mm)

The above-mentioned materials for the hydraulic cement composition were admixed with an aqueous solution of a mixture of monoethanolamine salts of the compound Nos. 5 and 6 (molar ratio: 4 : 1) in the proportion as mentioned in the following Table 5. The mixture was mixed for 3 minutes with a gravity mixer to give a concrete composition.

In the same manner as described in Test 1, there were measured the air content, the slump and the compressive strength of the concrete composition. The results are shown in the following Table 5.

Table 4

| Test compounds | Proportion of the test compounds to cement (% by weight) | Required slump (cm) | Found slump (cm) | Weight of water (kg/m³) | Weight of cement (kg/m³) | Water cement ratio (% by weight) | Weight of fine aggregate (kg/m³) | Weight of coarse aggregate (kg/m³) |
|---|---|---|---|---|---|---|---|---|
| Equimolar mixture of monoethanolamine salts of the compound Nos. 1 and 2 | 0.0078 | 18 | 18.4 | 166 | 300 | 55.3 | 727 | 1112 |
| | | 8 | 7.6 | 145 | 300 | 48.3 | 711 | 1183 |

| Test compounds | Ratio of the fine aggregate in whole aggregates (% by weight) | Air content (% by volume) | Compressive strength (kg/cm²) | |
|---|---|---|---|---|
| | | | 7 days | 28 days |
| Equimolar mixture of monoethanolamine salts of the compound Nos. 1 and 2 | 40 | 3.9 | 182 | 322 |
| | 38 | 3.5 | 229 | 377 |

Table 5

| Test compounds | Proportion of the test compounds to cement (% by weight) | Kind of aggregates | Weight of cement (kg/m³) | Weight of water (kg/m³) | Water cement ratio (% by weight) | Weight of fine aggregate (kg/m³) | Weight of coarse aggregate (kg/m³) |
|---|---|---|---|---|---|---|---|
| Mixture of monoethanolamine salts of compound Nos. 5 and 6 (molar ratio: 4 : 1) | 0.0078 | River sands & River gravels | 300 | 166 | 55.3 | 727 | 1112 |
| | | Manufactured sands & crushed stons | 300 | 206 | 68.7 | 799 | 926 |

| Test compounds | Ratio of the fine aggregate in whole aggregates (% by weight) | Air content (% by volume) | Compressive strength (kg/cm²) | |
|---|---|---|---|---|
| | | | 7 days | 28 days |
| Mixture of monoethanolamine salts of compound Nos. 5 and 6 (molar ratio: 4 : 1) | 40 | 3.9 | 172 | 313 |
| | 47 | 3.7 | 95 | 193 |

The compositions of the present invention are illustrated by the following Examples, but are not limited thereto.

EXAMPLE 1

A concrete composition is prepared by mixing well the following materials.

| | (Part by weight) |
|---|---|
| Equimolar mixture of the compound Nos. 1 and 2 | 0.0006 |
| Asano Portland Cement (made by Nihon Cement Co., Ltd., specific gravity: 3.16) | 16 |
| River sands (specific gravity: 2.58, finness modulus: 2.84) | 33.2 |
| River gravels (specific gravity: 2.60, maximum size: 25 mm) | 43.9 |
| Water | 6.8 |

EXAMPLE 2

A mortar composition is prepared by mixing well the following materials.

| | (part by weight) |
|---|---|
| Equimolar mixture of the compound Nos. 7 and 8 | 0.12 |
| Asano Portland Cement (made by Nihon Cement Co., Ltd., specific gravity: 3.16) | 30 |
| River sand (specific gravity: 2.58, finness modulus: 2.84) | 55 |
| Water | 14.88 |

EXAMPLE 3

A cement paste is prepared by mixing well the following materials.

| | (part by weight) |
|---|---|
| Ammonium salt of the compound No. 1 | 0.2 |
| Asano Portland Cement (made by Nihon Cement Co., Ltd., specific gravity: 3.16) | 70 |
| Water | 29.8 |

EXAMPLE 4

A concrete composition is prepared by mixing well the following materials.

| | (part by weight) |
|---|---|
| Equimolar mixture of the compound Nos. 1 and 2 | 0.0004 |
| Asano Portland Cement (made by Nihon Cement Co., Ltd., specific gravity: 3.16) | 10.9 |
| River sands (specific gravity: 2.58, finness modulus: 2.84) | 37.8 |
| River gravels (specific gravity: 2.60, maximum size: 25 mm) | 44.3 |
| Sodium gluconate | 0.004 |
| Triethanolamine | 0.002 |
| Water | 7.0 |

What is claimed is:

1. A hydraulic cement composition which contains an organic phosphoric acid ester of the formula:

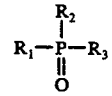

wherein $R_1$ is a group of the formula: $R_4-O-(CH_2CH_2O)_n-$ wherein $R_4$ is alkenyl having 4 to 18 carbon atoms or aryl substituted with an alkyl group having 4 to 18 carbon atoms and $n$ is an average addition molar number of ethylene oxide of 5 to 14, $R_2$ and $R_3$ are the same or different and are each hydroxy or a group of the formula: $R_4-O-(CH_2CH_2O)_n-$ wherein $R_4$ and $n$ are as defined above, or a salt thereof.

2. The hydraulic cement composition of claim 1, wherein said organic phosphoric acid ester is in the form of a salt thereof with an inorganic or organic base selected from the group consisting of sodium, potassium, magnesium, ammonium, monoethanolamine and hexylamine.

3. The hydraulic cement composition of claim 1, wherein the organic phosphoric acid ester is incorporated in an amount of 0.0001 to 2% by weight based on the weight of cement in the composition.

4. The hydraulic cement composition of claim 1, wherein said organic phosphoric acid ester is incorporated together with a dispersing agent selected from the group consisting of gluconic acid, sodium gluconate and glucono-δ-lactone.

5. The hydraulic cement composition of claim 1, wherein said organic phosphoric acid ester is a mixture of a monoester and a diester and/or a triester.

6. A hydraulic cement composition, which contains an organic phosphoric acid ester of the formula:

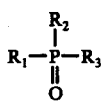

wherein $R_1$ is a group of the formula: $R_4-O-(CH_2CH_2O)_n-$, wherein $R_4$ is an aryl group substituted with an alkyl group having 4 to 18 carbon atoms and $n$ is an average addition molar number of ethylene oxide of 5 to 14, and $R_2$ and $R_3$ are the same or different and are each hydroxy or a group of the formula: $R_4-O-(CH_2CH_2O)_n-$, wherein $R_4$ and $n$ are as defined above, or a salt thereof.

7. The hydraulic cement composition of claim 6, wherein said organic phosphoric acid ester is in the form of a salt thereof with an inorganic or organic base selected from the group consisting of sodium, potassium, magnesium, ammonium, monoethanolamine and hexylamine.

8. The hydraulic cement composition of claim 6, wherein said organic phosphoric acid ester is incorporated in an amount of 0.0001 to 2% by weight on the basis of the weight of cement in the composition.

9. The hydraulic cement composition of claim 6, wherein said organic phosphoric acid ester is incorporated together with a dispersing agent selected from the group consisting of gluconic acid, sodium gluconate and glucono-δ-lactone.

10. The hydraulic cement composition of claim 6, wherein said organic phosphoric acid ester is a mixture of a monoester and a diester and/or a triester.

* * * * *